US012769784B2

(12) United States Patent
Bandhu et al.

(10) Patent No.: US 12,769,784 B2
(45) **Date of Patent: *Oct. 20, 2026**

(54) SYSTEM AND METHOD FOR MULTI-MEDIA SEARCH IN A CONTENT MANAGEMENT SYSTEM

(71) Applicant: OPEN TEXT INC., Menlo Park, CA (US)

(72) Inventors: Gajendra Babu Bandhu, Bangalore (IN); Sharath Babu Pulumati, Warangal (IN)

(73) Assignee: OPEN TEXT INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/815,429

(22) Filed: Aug. 26, 2024

(65) Prior Publication Data

US 2024/0419729 A1 Dec. 19, 2024

Related U.S. Application Data

(63) Continuation of application No. 16/708,011, filed on Dec. 9, 2019, now Pat. No. 12,079,270.

(51) Int. Cl.

*G06F 16/00* (2019.01)
*G06F 16/61* (2019.01)
*G06F 16/638* (2019.01)
*G06F 16/683* (2019.01)

(52) U.S. Cl.

CPC ............ *G06F 16/638* (2019.01); *G06F 16/61* (2019.01); *G06F 16/683* (2019.01)

(58) Field of Classification Search

CPC ....... G06F 16/638; G06F 16/683; G06F 16/61
USPC .......................................................... 707/769
See application file for complete search history.

(56) References Cited

U.S. PATENT DOCUMENTS

| | | | | |
|---|---|---|---|---|
| 2017/0193575 A1* | 7/2017 | King | .................. | G06Q 30/0601 |
| 2017/0318335 A1* | 11/2017 | Ding | ................ | H04N 21/26603 |
| 2018/0101545 A1* | 4/2018 | Jain | ........................ | G06F 16/178 |
| 2019/0245971 A1* | 8/2019 | Dwyer | ................ | H04M 3/5175 |
| 2020/0105274 A1* | 4/2020 | Joller | .................... | G06F 16/638 |
| 2020/0273456 A1* | 8/2020 | Naughton | ........... | H04M 3/4936 |

* cited by examiner

*Primary Examiner* — Raquel Perez-Arroyo
(74) *Attorney, Agent, or Firm* — Sprinkle IP Law Group

(57) ABSTRACT

A system comprising a client computer, a data store comprising a content management repository, a server computer coupled to the client computer by a network, the server computer comprising code for: receiving audio data; converting the audio data to text; extracting a specified string from the text as an extracted string; determining an extracted string attribute for the extracted string; storing a media file containing the audio data as a content object; configuring the content object to be searchable by the extracted string; receiving a search query from the client application; searching a plurality of managed objects based on the search query; and based on determining that the extracted string matches a search string, returning an indication of the first media file, the extracted string and the extracted string attribute in a search result.

14 Claims, 9 Drawing Sheets

SYSTEM AND METHOD FOR MULTI-MEDIA SEARCH IN A CONTENT MANAGEMENT SYSTEM

RELATED APPLICATION

This application is a continuation of, and claims a benefit of priority under 35 U.S.C. 120 of, U.S. patent application Ser. No. 16/708,011 filed Dec. 9, 2019, issued as U.S. Pat. No. 12,079,270, entitled "System and Method for Multi-Media Search in a Content Management System," which is hereby incorporated by reference herein for all purposes.

TECHNICAL FIELD

This disclosure relates generally to data storage. More particularly, this disclosure relates to methods and systems for managing and searching media content.

BACKGROUND

With the ever-increasing prevalence and proliferation of computer content has come a commensurate need for the management of such content. Content management systems do just that, allowing for the management of content by controlling the access, editing, updating, versioning, searching, etc. of content. Content management systems are often capable of storing and managing a variety of content types, such as word processing documents, spreadsheets, graphics, video files, audio files and other content. Content management systems have limitations, however, when dealing with certain types of content. For example, content management systems typically provide limited search capability for media files and no mechanism to search within the content of the media files.

SUMMARY

Attention is thus directed to systems and methods for managing and searching media content.

One embodiment comprises a computer program product comprising a non-transitory computer-readable medium storing computer-readable instructions for: providing a content management repository; receiving audio data to be stored in the content management repository; converting the audio data to a set of text; extracting a specified string from the set of text as an extracted string; determining a corresponding attribute of the extracted string; storing a first media file containing the audio data in the content management repository as a first managed object, the first managed object comprising set of object properties and the first media file; configuring the first managed object to be searchable by the extracted string; receiving a search query from a requestor, the search query containing a search string; searching a plurality of managed objects in the content management repository based on the search query; and based on determining that the extracted string matches the search string, returning an indication of the first media file, the extracted string and the corresponding attribute for the extracted string in a search result. According to one embodiment the audio data is received as the first media file.

According to one aspect of the present disclosure, the computer-readable medium comprises computer-readable instructions for: storing a second file in the content management repository, the second file containing the extracted string and corresponding attribute; and associating the second file with the first media file in the first managed object.

According another aspect of the present disclosure, the computer readable medium comprises computer-readable instructions for: providing an interface for a voice assistant tool service; assigning a unique user identifier to a voice assistant device that uses the voice assistant tool service; determining that the audio data is associated with the unique user identifier for the voice assistant device; and storing the first managed object in the content management repository as belonging to the voice assistant device.

According to another aspect of the present disclosure, the computer-readable medium comprises computer-readable instructions for: associating a search privilege with the unique user identifier for the voice assistant device; determining that the search query is for the voice assistant device assigned the unique user identifier; searching the content management repository according to the search privilege to generate the search result; and returning the search result to voice assistant tool service.

Another embodiment includes a system that comprises a client computer, a data store and a server computer. The client computer comprises a client application executable to provide an interface between an end-user and a content management system. The data store comprises a content management repository storing a plurality of managed objects. The server computer comprises code for: providing the content management system; receiving, from the client application, audio data to be stored in the content management repository; converting the audio data to a set of text; extracting a specified string from the set of text as an extracted string; determining a corresponding attribute of the extracted string; storing a first media file containing the audio data in the content management repository as a first managed object, the first managed object comprising set of object properties and the first media file; configuring the first managed object to be searchable by the extracted string; receiving a search query from the client application, the search query containing a search string; searching the plurality of managed objects in the content management repository based on the search query; and based on determining that the extracted string matches the search string, returning an indication of the first media file, the extracted string and the corresponding attribute for the extracted string in a search result.

According to one aspect of the present disclosure, the server computer comprises code for: storing a second file in the content management repository, the second file containing the extracted string and corresponding attribute; and associating the second file with the first media file in the first managed object.

According another aspect of the present disclosure, the server computer comprises code for: providing an interface for a voice assistant tool service; assigning a unique user identifier to a voice assistant device that uses the voice assistant tool service; determining that the audio data is associated with the unique user identifier for the voice assistant device; and storing the first managed object in the content management repository as belonging to the voice assistant device.

According to another aspect of the present disclosure, the server computer comprises code for: associating a search privilege with the unique user identifier for the voice assistant device; determining that the search query is for the voice assistant device assigned the unique user identifier; searching the content management repository according to the search privilege to generate the search result; and returning the search result to voice assistant tool service.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
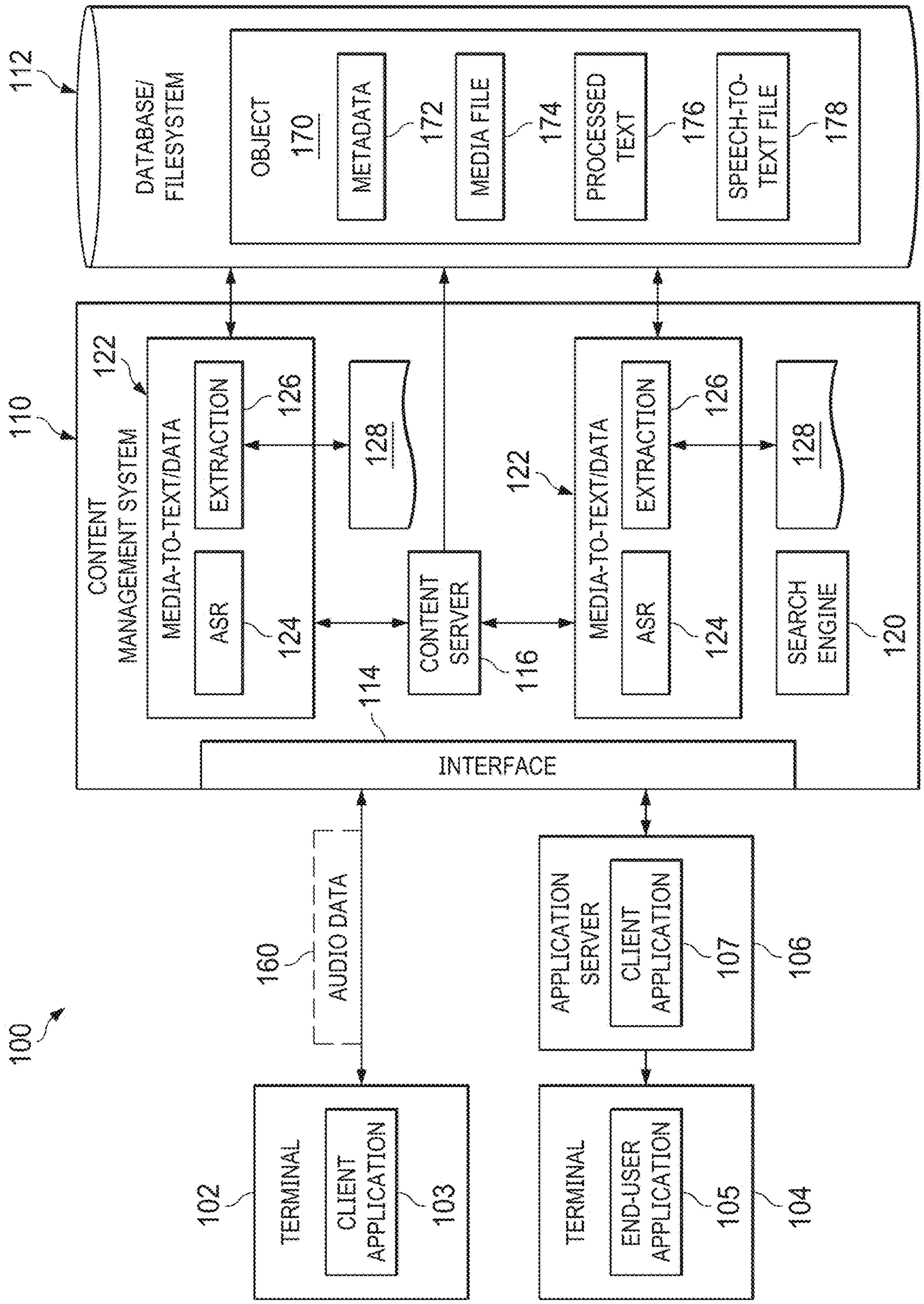
FIG. 1 is a diagrammatic representation of one embodiment of a system for managing and searching content.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments described herein provide mechanisms for storing media content in a content management system (CMS) in a manner that allows for efficient searching in/on the media content. In one embodiment, a CMS receives a media data stream that includes audio data and encodes the media data as a media file (e.g., audio/voice/video file). In another embodiment, the CMS receives the media data already encoded as a media file. The CMS provides the media data to an automatic speech recognition (ASR) processor to generate text formatted data from the audio data. The CMS parses the text formatted data generated by the ASR for target strings (e.g., words or phrases) to extract matching strings and, in some cases, determines attributes corresponding to the extracted strings (an attributed extracted or determined for an extracted string is referred to herein as an "extracted string attribute"). Examples of extracted string attributes include, but are not limited to, the number of times the same string was identified in the text formatted data, an identification of the speaker of the extracted string, the identification of the gender of the speaker of the extracted string, temporal location in the media file at which an instance of the extracted string occurs.

The CMS stores the received media data as a media file and stores the extracted strings and associated extracted string attributes in association with the media file. In various embodiments, the CMS stores the extracted strings and associated extracted string attributes in a readable formatted file (for example, a csv file or other formatted file), a text file, a Trie or as another type of data structure in a file system or database (e.g., relational database or non-relational database), where the data structure is stored in association with the media file. In one embodiment, the CMS stores the extracted strings, along with the extracted string attributes as properties of a media content object. In an even more particular embodiment, the CMS stores the extracted strings, along with associated attributes in one or more repeating properties of a media content object. The CMS, in some embodiments, also stores the whole text formatted data in association with the media file (e.g., in a readable text file or other data structure that is associated with the media file).

When a request for a search is triggered to search a string, the CMS can use the extracted strings and associated extracted string attributes to respond to the request if the search string is found in the extracted strings. In one embodiment, the CMS responds with the path of the associated media file if the corresponding string is found. The search result may also include the extracted strings that match the search string and the associated attributes of the extracted strings.

It can be noted then, that in some embodiments that the media files and extracted strings are stored in such a way to allow a search engine to search based on the contents of the media files even if the search engine cannot index or access the contents from the media files themselves.

These and other aspects of content management may be better understood with reference to non-limiting embodiments described in conjunction with the figures.

FIG. 1 is a diagrammatic representation of one embodiment of a system 100 for managing and searching content. System 100 includes terminal 102 running a client application 103, terminal 104 running end-user application 105, application server 106 running client application 107 and CMS 110. CMS 110 includes or is coupled to a data store 112, which can include one or more databases, filesystems or other types of data stores or combinations thereof. Various components of system 100 may be bi-directionally coupled by one or more networks. The networks can include a combination of wired and wireless networks that the network computing environment may utilize for various types of network communications. The networks can include a local area network (LAN), a wide area network (WAN) such as the Internet, mobile network, or other type of network or combination thereof.

CMS 110 comprises one or more computer systems with central processing units executing instructions embodied on one or more computer-readable media where the instructions are configured to perform at least some of the functionality associated with embodiments of the present invention. CMS 110 may be a single tenant or multi-tenant system. According to one embodiment, CMS 110 is implemented as a cloud-based CMS.

CMS 110 provides interfaces 114 (e.g., Representational State Transfer (ReST) application programming interface (API) or other API or interface) through which client application 103 and client application 107 can interact with CMS 110 to store content, search content, access content and perform other operations with respect to content. CMS 110 includes a content server 116, search engine 120 and media-to-text/data engines 122. While content server 116, media-to-text/data engines 122 and search engine 120 are illustrated separately, the components may be otherwise configured. For example, in another embodiment content server 116 incorporates media-to-text/data engines 122 and/or search engine 120.

According to one embodiment, CMS 110 is object-oriented. Each item of managed content is a content object. A content object includes associated content and associated content object metadata. The associated content is stored as a content file. Content files associated with the content objects are stored in a file system, in a database (e.g., as blobs in a relational database or non-relational database), or as sets of logically related data that are managed as a file. The content object metadata for each content object is stored as a record in a database (e.g., a relational or non-relational database) and includes a reference to the associated content file. As will be appreciated, CMS 110 may support a wide variety of content object types. Content objects used to store media files are referred to herein as media content objects. There may be a number of different media content object types defined in CMS 110.

According to one embodiment, content object metadata is contained in properties. Properties are the fields that comprise an object definition. The values in those fields describe individual instances of the object type—that is, the values for the properties describe individual content objects. When an object is created, its properties are set to values that describe that particular instance of the object type. For example, if two properties of a media content object type are “title” and “subject” then each media content object of that type will have title and subject properties containing respective values for each media content file.

According to one embodiment, properties are either a single-valued type or repeating type. A property of the single-valued type (a “single-valued property”) stores one value or, if it stores multiple values, stores them in one list (e.g., a comma separated list). Querying a single-valued property returns the entire value, whether it is one value or a list of values. The tables that store the values for single-valued properties are referred to as “_s tables” herein. A property of the repeating type (a “repeating property”) stores multiple values in an indexed list. Index positions within the list can be specified when referencing a specific value in a repeating property. As an example, say a media content object type has the repeating properties “keywords” and “presenters,” then the index position within the list of a repeating property for a particular media content object of that type (a particular instance of the media content object type) can be specified in brackets at the end of the property name (“keywords[2]” or “presenters[17]”). Full-text queries can also locate specific values.

In one embodiment, each persistent object type is represented by a corresponding single-valued table (referred to as an “_s table” herein) and repeating value table (referred to as an “_r table” herein). In the _s tables, each column represents one property and each row represents one instance of the object type. The tables that store the values for single-valued properties are identified by the object type name. The column values in the row represent the single-valued property values for that object. In the _r tables, each column represents one property and there is a separate row for each value in a repeating property. Each row includes an object_id to identify the object that contains the repeating property values. If an object type has two or more repeating properties, the number of rows in the _r table for each object of that type is equal to the number of values in the repeating property that has the most values. The columns for repeating properties having fewer values are filled with NULLS in rows below the last value for that repeating property.

In general, content server 116 manages, protects and imposes structure on content in data store 112. For example, content server 116 manages the creation, modification and access to content in data store 112. Content server 116 can support a variety of content management features such as, but not limited to, security features to control access and automate accountability, check out/check in, versioning, workflows, lifecycles, sharing, collaboration and other features. According to one embodiment, content server 116 imposes an object-oriented structure on the content in data store 112. When content is added to CMS 110, content server 116 parses the content metadata (e.g., file metadata or other metadata provided for the content to be stored), automatically generates additional information about the object, stores the metadata in a database and puts a copy of the content file into the file store. Once stored as an object in the repository, end-users can access and interact with the content.

Search engine 120 provides indexing and search of content objects, including media content objects and other types of content objects. Search engine 120, in some embodiments, is capable of indexing certain types of content but not other types of content. For example, the search engine may be capable of indexing text content but not audio content. Indexing, then, can include indexing the content object properties—that is, indexing the property values—and indexable content of content objects.

Media-to-text/data engines 122 provide speech-to-text capability. Each media-to-text/data engine 122 can be configured for particular types or formats of media (e.g., a media-to-text/data engine 122 for a first audio file type, a media-to-text/data engine 122 for a second audio file type, a media-to-text/data engine 122 for a first video file type and so on). In the illustrated embodiment, each media-to-text/data engine 122 applies automatic speech recognition (ASR) processor 124 and an extraction engine 126. ASR processor 124 converts speech to text using ASR algorithms known or developed in the art and extraction engine 126 extract strings from the text and determines attributes for the extracted strings.

According to one embodiment, a configuration 128 is provided which specifies what information to extract from the text produced by ASR processor 124. More particularly, configuration 128 defines a set of target strings for which to parse text formatted data. In some embodiments, a target string can be defined as a pattern to match. In some cases, configuration 128 also defines one or more attributes to determine for strings matching a target string. An attribute may be, for example, a metric such as a number of times a string is matched in a set of text. An attribute may also include information about a matching string that can be extracted from the text. As will be appreciated, the types of information about an extracted string that extraction engine 126 can determine will depend, at least in part, on the output of ASR processor 124. For example, if the output of ASR processor 124 includes the temporal location of each word or block of words in the media file, then extraction engine

126 can be configured to extract the temporal location at which each instance of a matching string occurs. If ASR processor 124 outputs the gender of the speaker, then extraction engine 126 can extract the gender of the speaker as an attribute of an extracted string.

Configuration 128 can also specify a target data structure associated with a target string and attribute. For example, configuration 128 may specify a content object property into which to write an extracted string and associated extracted string attribute.

Extraction engine 126 is configured with parsing rules to parse the text output by ASR processor 124 for one or more target strings according to configuration 128. If the text output by ASR processor 124 includes a string matching a target string, extraction engine 126 extracts the string as an extracted string. Extraction engine 126 also determines any extracted string attributes specified in configuration 128 for the extracted string (e.g., number of times the extracted string appears in the text or other attributes).

Extraction engine 126 writes the extracted strings and associated extracted string attributes to the appropriate data structures as specified by, for example, configuration 128. In one embodiment, extraction engine 126 stores extracted strings and extracted string attributes in one or more properties of a respective media content object. In an even more particular embodiment, extraction engine 126 stores the extracted threads and extract thread attributes in one or more repeating properties of the media content object. In another embodiment, extraction engine 126 stores the extracted strings and associated extracted string attributes in a formatted file (for example, a csv file or other formatted file), a text file, a blob object, a Trie or other type of data structure in a file system or database and updates a media content object to reference the data structure. In some embodiments, extraction engine 126 also stores the whole text produced by ASR processor 124 from a set of audio data in a file, blob object or other data structure.

Turning to other entities in system 100, client applications (e.g., client application 103 and client application 107) provide interfaces between CMS 110 and end-users. Client application 103 is implemented on an end-user's terminal to provide an interface to CMS 110. For example, client application 103 may be implemented as a heavy end-user program to access CMS 110. Client application 107, on the other hand, is implemented on application server 106. An end-user can use end-user application 105—for example, a web browser—to access client application 107 running on application server 106. End-users can interact with content managed by content server 116 and search content using search engine 120 through the client applications.

Terminals 102, 104 include hardware and software to allow an end-user to record media data that includes audio data. In the case of terminal 102, client application 103 provides the media data to content server 116. In the case of terminal 104, end-user application 105 provides the media data to client application 107 and client application 107 provides the media data to content server 116. In one embodiment, content server 116 receives the media data as streamed media data and encodes the media data as a media file (e.g., an audio file, video file or other media file). In another embodiment, the media data is encoded at terminal 102, 104 or application server 106 such that content server 116 receives the media data in an encoded media file.

In operation then, content server 116 can receive a request from client application 103 (or client application 107) to store audio data 160. The audio data 160 can be received as streamed media data, as a media file (e.g., audio or video file) or according to any other media data format. Content server 116 creates a media content object 170 for audio data 160, parses the file metadata or other metadata provided by client application 103 for audio data 160, automatically generates other metadata as dictated by implementation, and passes the media content object 170, which includes the metadata 172 (e.g., object id, object name, storage location, owner, creation date, modification date, media file duration, and/or other metadata) and media file 174 (i.e., the media file containing audio data 160), to media-to-text/data engine 122.

Media-to-text/data engine 122 converts audio data 160 to text formatted data, extracts strings matching the target strings specified in configuration 128, determines associated extracted string attributes for the extracted strings and stores media content object 170 in data store 112. CMS 110 configures media content object 170 to be searchable by the extracted strings. In one embodiment, media-to-text/data engine 122 adds the extracted strings and the extracted string attributes associated to media content object 170 as processed text 176, which is stored in a data structure indexable or otherwise searchable by search engine 120. Configuring media content object 170 to be searchable by the extracted strings may also include search engine 120 indexing processed text 176.

According to one embodiment, processed text 176 is stored as properties of media content object 170 (e.g., as a portion of metadata 172). Even more particularly, in one embodiment, media-to-text/data engine 122 stores the extracted strings and associated extracted string attributes in one or more repeating properties of media content object 170. In addition, or in the alternative, media-to-text/data engine 122 stores extracted strings and associated extracted string attributes as a formatted file (for example, a csv file or other formatted file), a text file, a blob object, a Trie or other type of data structure in a file system or database and adds a reference to the data structure holding the extracted strings and associated extracted string attributes to the metadata 172 of media content object 170. According to one embodiment, media-to-text/data engine 122 also stores the text formatted data output by ASR processor 124 as part of media content object 170. For example, media-to-text/data engine 122 stores the text formatted data as speech-to-text file 178 and adds a reference to speech-to-text file 178 to media content object 170. In some embodiments, content server 116 also sets permissions on media content object 170 as applicable.

Search engine 120 indexes media content object 170, including processed text 176 that includes the extracted strings and extracted string attributes associated with the extracted strings. For example, search engine 120 performs a full text indexing of the property tables of media content object 170 or other data structure that holds extracted strings and associated extracted string attributes. According to one embodiment, search engine 120 indexes speech-to-text file 178. In the index, keywords or phrases indexed from processed text 176 or speech-to-text file 178 are associated with the object identifier of the media content object 170. In some embodiments, the index includes the extracted string attributes associated with the extracted strings for quick retrieval in response to a search request.

Users submit search requests that include search strings to content server 116 (e.g., via client application 103, 107) and content server utilizes search engine 120 to search data store 112. Search engine 120 uses its index to search data store 112 for matching content objects that satisfy the search request. As discussed above, search engine 120 indexes content objects, including indexing processed text of media content objects. Thus, determining which content objects in data store 112 satisfy a search request can include identifying matching media content objects based on the processed text of the media content objects. For example, search engine 120 can identify media content object 170 as responsive to a search request based on processed text 176 (or other indexed information) of media content object 170 matching search criteria in the search request.

Search engine 120 generates a search response identifying the matching content objects. Based on a determination that a media content object, such as media content object 170, matches a search request, search engine 120 formulates a response that includes information about the media content object, such as the file name, location or other identifier that can be used to retrieve the respective media content file (e.g., media file 174) and/or speech-to-text file (e.g., speech-to-text file 178). According to one embodiment, the search response also includes the keywords or phrases that match the search request. If the matching keyword or phrase is from an extracted string, the response may also include the associated extracted string attributes, if any, for the extracted string. For example, the search response may include the number of times the matching string appears in media file 174, the gender of the speaker of the matching string, the temporal location at which the matching string occurs in media file 174 or other attributes.

Content server 116 returns the search response to the appropriate client application 103, 107. The content objects included in a search result can include both media content objects and other types of content objects. As will be appreciated, each search request may be associated with a user. In such an embodiment, the search engine 120 can be adapted to generate a search result for a user such that the search result only includes media content objects to which that user has access.

Content server 116 can further receive a request from a user to access media content object 170, such as a request to access the respective media file 174. Such request may have been generated based on a prior search result. If the requesting user has permission to access media content object 170, content server 116 provides media file 174 to the user. In one embodiment, the request can include a temporal location (e.g., as specified in a prior search result) at which to access the media file. In some embodiments, content server 116 provides media file 174 configured to begin playing at the temporal location in an end-user's media player (e.g., a media player provided by client application 103 or end-user application 105).

Figure 2:
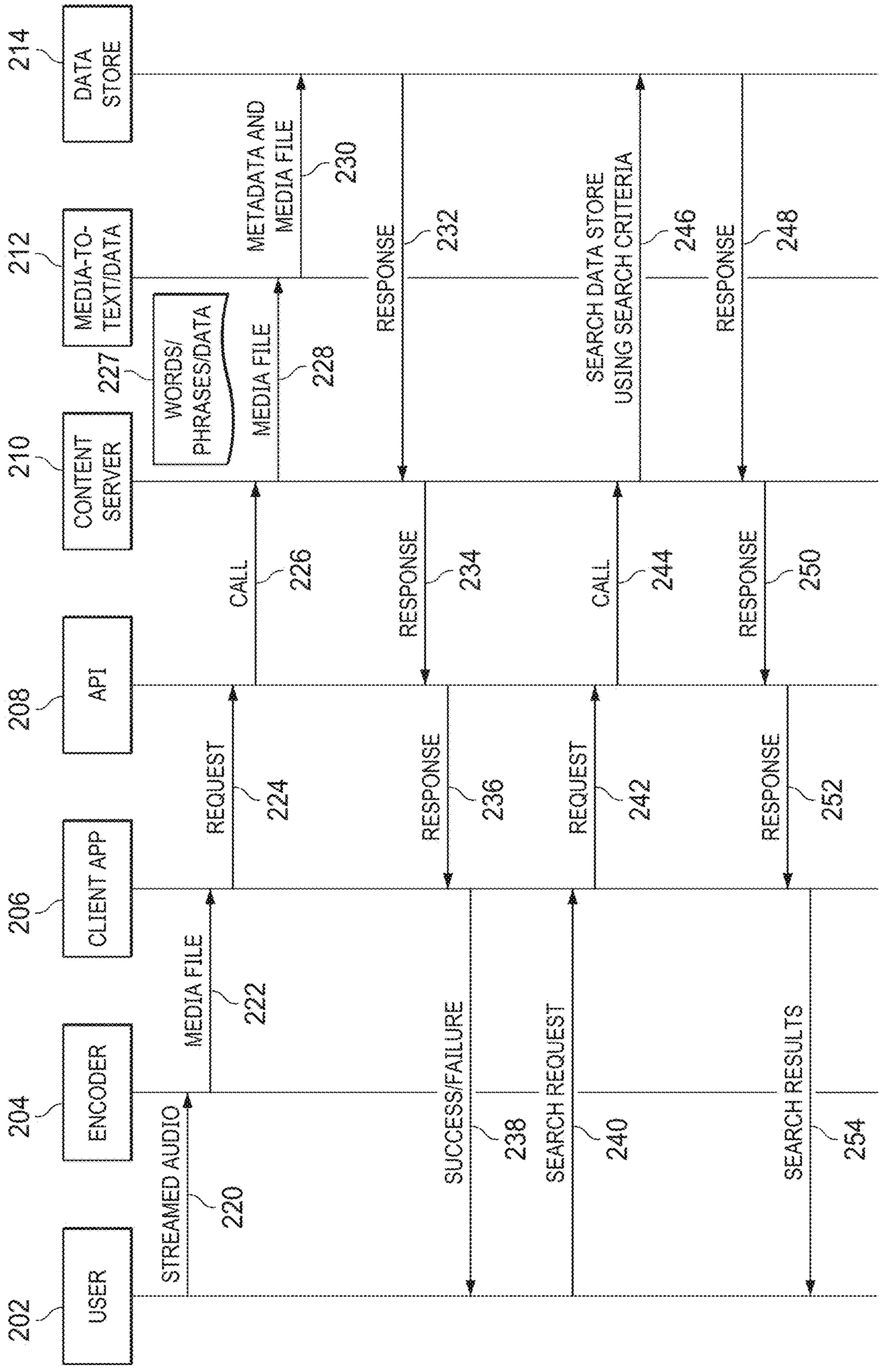
FIG. 2 is a diagrammatic representation of one embodiment of a data flow in a system for managing and searching content.

FIG. 2 is a diagrammatic representation of one embodiment of a data flow in a system for managing and searching content. In the embodiment of FIG. 2, the system includes end-user application 202, encoder 204, client application 206, API 208, content server 210, media-to-text/data engine 212 and data store 214. The system of FIG. 2 also includes a search engine (not shown) for searching data store 214.

End-user application 202 executes on an end-user terminal. In one embodiment, encoder 204 and client application 206 also execute on the end-user terminal. In another embodiment, client application 206 executes on an application server and encoder 204 executes on the end-user terminal or application server, depending on implementation.

Content server 210 and the search engine execute as part of a CMS (e.g., CMS 110). Content server 210 manages, protects and imposes structure on content in data store 214. According to one embodiment, content server 210 imposes an object-oriented structure on content in data store 214. API 208 provides an interface through which client application 206 can interact with content server 210 to store content, search content, access content and perform other operations with respect to content. Media-to-text/data engine 212 converts audio data to text formatted data and extracts strings matching target strings and determines associated extracted string attributes from the text formatted data. Some non-limiting example embodiments of media-to-text/data engine 212 are discussed above with respect to media-to-text/data engines 122.

In the embodiment of FIG. 2, an end-user uses an input device at the end-user terminal to communicate or stream media to be stored by a content server. As such, end-user application 202 provides streamed media data to encoder 204 (data flow 220), which encodes the streamed audio data and sends a media file 222 to client application 206. Client application 206 generates a request to API 208 to store the media file (request 224) and API 208 generates a call 226 (e.g., a remote procedure call (RPC), gRPC, or other request) to content server 210 to store the media file. Content server 210 provides the media file to media-to-text/data engine 212 (data flow 228).

Media-to-text/data engine 212 includes an ASR processor to convert the media file to text formatted data and parses the text formatted data according to a configuration 227 to extract words/phrases or other strings and associated data from the text formatted file. Media-to-text/data engine 212 stores the media file and related metadata to data store 214 (data flow 230). According to one embodiment, media-to-text/data engine 212 stores the media file and metadata as a media content object. Media-to-text/data engine 212 configures the media content object to be searchable by the extracted strings. For example, media-to-text/data engine 212 adds the extracted strings and the extracted string attributes associated with those strings to the media content object at a location that is indexable or otherwise searchable by the search engine. According to one embodiment, the extracted strings and associated extracted string attributes are stored as properties of the media content object (e.g., as a portion of the metadata). Even more particularly, in one embodiment, media-to-text/data engine 212 stores the extracted strings and associated extracted string attributes in one or more repeating properties of the media content object. In addition, or in the alternative, media-to-text/data engine 212 stores extracted strings and associated extracted string attributes as a file (e.g., in a csv format or other format), blob object, a Trie or as another type of data structure in a file system or database and adds a reference to the data structure holding the extracted strings and associated extracted string attributes to the metadata of the media content object. According to one embodiment, media-to-text/data engine 212 also stores the text formatted data output by the ASR processor as part of the media content object.

When the media content object has been successfully stored or the storing of the content object fails, the data store 214 sends a response 232 to content server 210 and content server 210 makes a call 234 to API 208 with a success or failure response. Client application 206 receives a success or failure response 236 to request 224 via API 208. Client application 206 sends a success/failure response 238 to the end-user application 202.

The end-user application 202 can send a search request 240 that includes one or more search criteria, such as strings for which to search, to client application 206. Client application 206 sends the search request 242 to API 208 and API generates a call 244 to content server 210 to search data store 214 according to the search criteria. Content server 210 uses the search engine to search data store 214 according to the search criteria (as represented at 246). In searching data store 214, the search engine searches the properties and indexable content of the content objects. For media content items, the search engine searches the metadata of the media content item to determine if the metadata of the content object matches the search criteria. If the extracted strings for the media content object are stored in the metadata of the content objects, searching the metadata includes searching the extracted strings. If the extracted strings of the media content objects are stored in another data structure, the search engine performs a full text search of the data structure that holds the extracted strings for the content object.

The search engine sends a response 248 indicating the content objects, including the media content objects, that meet the search criteria. For each media content object meeting the search criteria, response 248 can include, for example, the media file path of the corresponding media file. Response 248 can also include the extracted string matching the search criteria and the associated extracted string attributes for the extracted string. Content server 210 generates a call 250 to API 208 to send the search response 252 to the client application 206. Client application 206 returns the search results 254 to end-user application 202.

Figure 3:
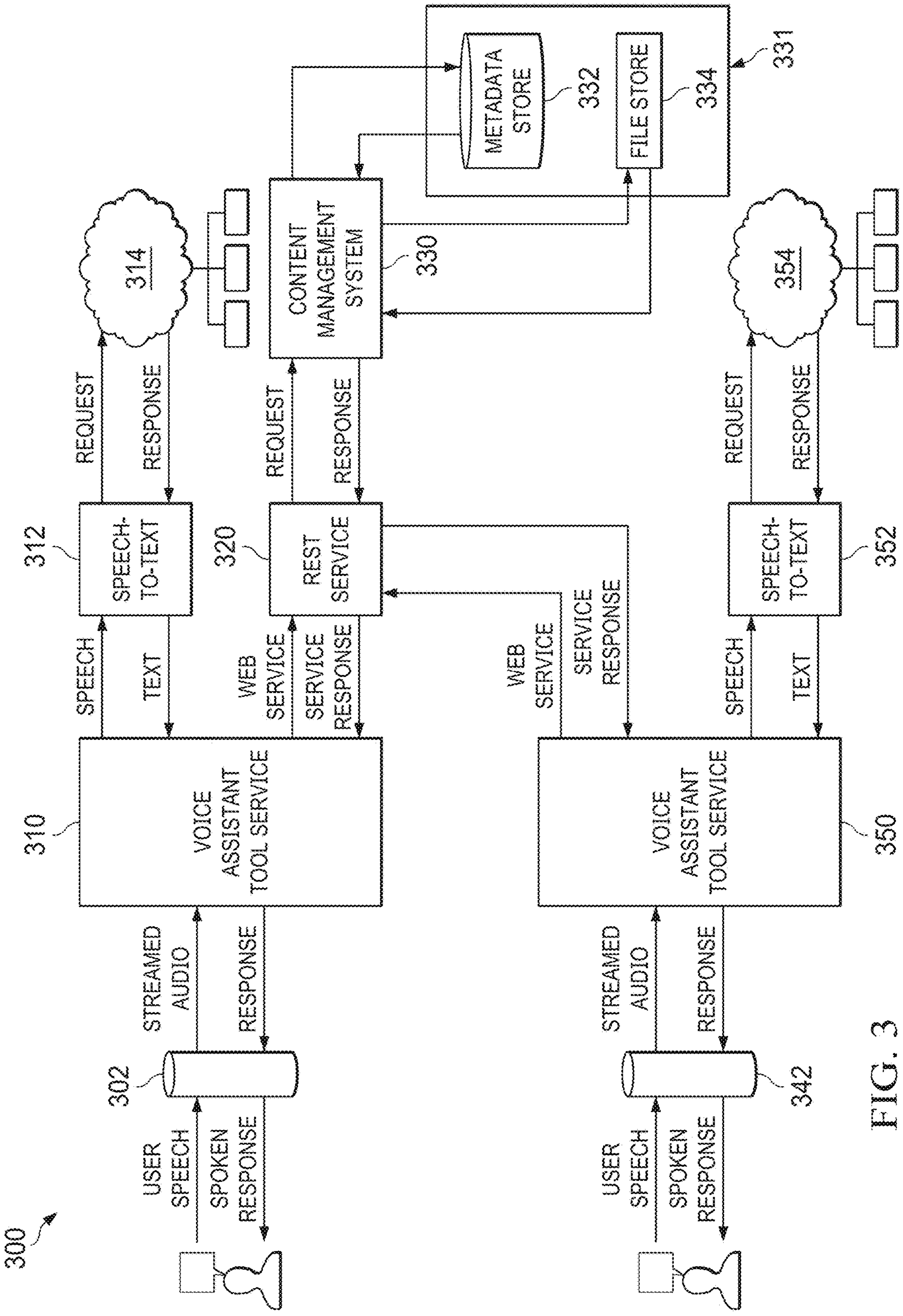
FIG. 3 is a diagrammatic representation of another embodiment of a system for managing and searching content.

A CMS supporting management and searching in/on media content may be implemented in a variety of environments. As just one example, a CMS can be integrated with one or more voice assistant tool services. FIG. 3, for example, is a diagrammatic representation of one embodiment of a system 300 for managing and searching content that includes a CMS 330 integrated with a first voice assistant tool service 310 and a second voice assistant tool service 350. System 300 further comprises a voice assistant tool device 302 connected to a cloud-based voice assistant tool service 310, which includes speech-to-text processor 312 and connects to web services 314. In addition, an interface (e.g., ReST service 320) is provided to interface between voice assistant tool service 310 and CMS 330. CMS 330 stores content as content objects in a data store 331, which includes a metadata store 332 to store object metadata (e.g., object property values) and a file store 334 to store content files. A content object can thus include associated object metadata stored in metadata store 332 and a content file stored in file store 334. System 300 also comprises a voice assistant tool device 342 connected to a cloud-based voice assistant tool service 350, which includes speech-to-text processor 352 and connects to web services 354. There may be a great many voice assistant tool devices connected to voice assistant tool service 310 and/or voice assistant tool service 350. According to one embodiment, each voice assistant tool device is considered a "user" in CMS 330 and is assigned a unique user id in CMS 330.

As will be appreciated, a number of vendors offer voice assistant tools. In general, the voice assistant tool devices include an application that listens for a wake signal (a "wake word," a particular interaction with an interface or other wake signal). If the wake signal is detected, the voice assistant tool signals speech recognition software and streams subsequent audio data to the speech recognition software, which the speech recognition software converts to text formatted data. The voice assistant tool service processes the text for a command. Generally, a command includes a keyword or phrase to trigger a specific action and utterances that identify the user's intent with respect to that skill. Thus, for example, when a user speaks to voice assistant tool device 302 and voice assistant tool device 302 detects its wake signal, it signals voice assistant tool service 310 and streams the user's speech to voice assistant tool service 310 as streamed audio. Voice assistant tool service 310 processes the streamed speech with speech-to-text processor 312 to generate text formatted data and performs natural language processing to identify the skill to trigger and the user's intent. Based on the skill and user's intent, voice assistant tool service 310 can make requests to web services 314 (including third party web services) if needed. When voice assistant tool service 310 receives a response from the web services or otherwise collects the data to respond to the command, voice assistant tool service 310 sends a response to voice assistant tool device 302. The response can include a variety of data types, such as text data, audio data or other data types that voice assistant tool 302 can output to the user.

For a command made with respect to CMS 330, voice assistant tool service 310 (e.g., a lambda function) sends an HTTPs request to an endpoint in a client application that uses ReST services 320 to communicate with CMS 330. CMS 330 returns a result to the client application at another endpoint, which is read by voice assistant tool service 310 (e.g., the lambda function). Voice assistant tool service 310 reports the result to voice assistant tool device 302, which the voice assistant tool device 302 outputs to the user (e.g., as audio and/or in a graphical user interface). Voice assistant tool service 350 operates similarly.

Various other services native to voice assistant tool 310, 350 or available through voice assistant tool service 310 (e.g., services 314, 354) can be used to provide additional functionality for content retrieved from or stored to CMS 330. For example, services can be used to provide functionality such as language detection, text-to-speech conversion that transforms text into lifelike speech and content translation to translate text between languages.

In some embodiments, the capability to listen for a wake signal and to interact with a respective voice assistant tool service 310, 350 is integrated as part of an end-user application (e.g., a mobile application, a desktop application) that provides a graphical user interface through which the user can also interact with the voice assistant tool service 310, 350 or service 314, 354, 320 to which the voice assistant tool service 310, 350 connects. Thus, in some embodiments, the voice assistant tool device 302, 342 can display information contained in the response from voice assistant tool service 310, 350 in a graphical user interface at the voice assistant tool device 302, 342. In addition, or in the alternative, the voice assistant tool device 302 reads the response, plays media or otherwise responds to the user.

Currently available voice assistant tool services offer rich ecosystems of skills that can be triggered and are extensible to incorporate new skills. As such, skills can be added to utilize CMS 330. A skill can be added to utilize the content management system. Examples of a voice commands with respect to CMS 330 include, but are not limited to:

"[wake word] open CMS": the voice assistant tool service 310, 350 processes the statement (e.g., using speech-to-text processor 312, 352) to extract the command and understand that the speaker wishes to interact with CMS 330. In response, for example, the voice assistant tool service 310, 350 connects to CMS 330 via ReST service 320 and, upon successful connection sends back a response to voice assistant tool device 302, 342. The statement such as "CMS now connected, what can I do for you?" The user can then use predefined voice commands to interact with CMS 330. Some commands may only be supported by voice assistant tool devices that include a display.

"help": causes the voice assistant tool service 310, 350 to return a response indicating the types of services that can be performed with respect to CMS 330;

"get folders": causes voice assistant tool service 310, 350 to request the available folders from CMS 330. CMS 330 returns a list of folders available to the particular voice assistant device 302, 342 or user. If the voice assistant tool device is a device with a screen, the voice assistant tool service 310, 350 can return a graphical user interface that represents the available folders. In addition, or in the alternative, the voice assistant device 302, 342 reads the list of folders to the user.

"show me [folder]" (e.g., "show me the projects folder"): causes voice assistant tool service 310, 350 to request details on the objects (e.g., folders, files) stored in [folder] from CMS 330. CMS 330 returns a list of content items (e.g., documents) in [folder], which voice assistant tool service 310, 350 returns to the voice assistant tool device 302, 342. The content items returned are the objects in [folder] to which the particular voice assistant device 302, 342 has access. If the voice assistant tool device is a device with a screen, the voice assistant tool device can display a graphical user interface that represents the content items in the folder. In addition, or in the alternative, the voice assistant device 302, 342 reads the list of content items to the user. If [folder] cannot be found, then voice assistant tool service 310, 350 returns an indication that the folder cannot be found, which voice assistant device 302, 342 displays and/or reads to the user.

"open the [content item]" (e.g., "open the 5$^{th}$ document"): causes voice assistant tool service 310, 350 to interact with CMS 330 to open the indicated content item from the previously returned list of content items. CMS 330 returns the requested content item metadata and file which voice assistant tool service 310, 350 returns to the voice assistant tool device 302, 342. The voice assistant device 302, 342 opens the content item locally (e.g., displays the document, plays a media content item).

"open the [content item] in a new tab": similar to "open the content item", but causes voice assistant tool device 302, 342 to display the opened document in a new tab in the user interface.

"read the [document]", "read the document section [section]", "read the document page number [page number] ": if the opened content item is a document, the user can request that the voice assistant tool service 310, 350 read the document or indicated portion of the document (e.g., a section or page of the document). The voice assistant tool service 310, 350 parses the text of the document or document using text-to-speech processing and provides an audio stream or file of the generated speech to voice assistant tool device 302, 342, which the voice assistant tool device 302, 342 reads to the user.

If the document is in a different language than a primary language of voice assistant tool service 310, 350, the voice assistant tool service 310, 350 provides the indicated document or portion to a speech-to-text service (e.g., a service 314, 354) capable of handling native language of the document, receives an audio file or audio stream of the translated text, and provides the audio data to voice assistant tool device 302, 342, which voice assistant tool device 302, 342 plays for the user.

"translate it to [language]": the user can request that the voice assistant tool service 310, 350 read the most recently read document or portion of the document in another language. For example, assume the user first provides the command "read document section Introduction," which cause the Introduction section of the document to be read in the native language of the document as described above, the user can then issue the command "translate it to German," which will be interpreted in context to translate the Introduction section of the document into German speech. The voice assistant tool service 310, 350 provides the indicated document or section and target language to a translation service (e.g., a service 314, 354) to translate the text into the target language and receives the translated text. The voice assistant tool service 310, 350 provides the translated text to a text-to-speech service (e.g., a service 314, 354) capable of handling the target language, receives responsive audio data (audio file or audio stream) of the translated text in response, provides the audio data to voice assistant tool device 302, 342, which the voice assistant tool device 302, 342 reads or plays to the user.

"translate the [document] to [language]", "translate the document section [section] to [language]", "translate the document page number [page number] to [language]": if the opened content item is a document, the user can request that the voice assistant tool service 310, 350 translate the document or portion of the document into another language. The voice assistant tool service 310, 350 provides the indicated document or section and target language to a translation service (e.g., a service 314, 354) to translate the text into the target language and receives the translated text. The voice assistant tool service 310, 350 provides the translated text to a text-to-speech service (e.g., a service 314, 354) capable of handling the target language, receives responsive audio data (audio file or audio stream) of the translated text in response, provides the audio data to voice assistant tool device 302, 342, which the voice assistant tool device 302, 342 reads or plays to the user.

"translate the [document] to [language] and save the translated document to CMS": if the opened content item is a document, the user can request that the voice assistant tool service 310, 350 translate the document into another language and save the translated document to CMS 330. The voice assistant tool service 310, 350 provides the document and language to a translation service (e.g., a service 314, 354), receives translated document in response, and interacts with CMS 330 (e.g., via ReST 320) to store the translated document to CMS 330. When voice assistant tool service 310, 350 receives an indication that the document has been successfully saved to CMS 330, the voice assistant tool service 310, 350 returns a response, such as "translation successful", which the voice assistant tool device 302, 342 displays or reads to the user.

Various other commands may also be supported, such as commands to alter the user interface (e.g., "delete [number] tab", switch to main tab) or other commands.

"exit CMS": the voice assistant tool service 310, 350 processes the command to close the connection with CMS 330. Voice assistant tool service 310, 350 sends back a response indicating the CMS is disconnected, which the voice assistant tool device 302, 342 outputs to the user. The voice assistant tool device 302, 342 may also close the end-user application being used to interact with CMS 330.

According to one embodiment a skill can be added to store speech data to CMS 330. As will be appreciated, a voice assistant tool service 310, 350 may already support the capability to transcribe speech to text (e.g., either through the respective speech-to-text processor 312, 352 or a third-party web service 314, 354). Thus, for example, a skill can be implemented to "store the following to CMS [additional speech]" which utilizes the existing speech-to-text capabilities of voice assistant tool service 310, 350 to convert the [additional speech] to text. In such an embodiment, once the [additional speech] is converted to text, the voice assistant tool service 310, 350 issues a web services call to ReST service 320 to store a media file containing the [additional speech] and the text formatted data generated from the [additional speech] as a media content object. ReST service 320 issues the appropriate call (e.g., RPC, gRPC or other call) to CMS 330.

In such an embodiment, CMS 330 stores the media file as a content object, storing the file in file store 334 and metadata in metadata store 332. CMS 330 further parses the voice assistant tool service provided text formatted data for target strings, extracts strings and determines extracted string attributes for the extracted strings. CMS 330 stores the extracted strings and associated extracted string attributes in the properties of the content object (e.g., in one or more repeating properties), as a file (e.g., in a csv format or other format), a database blob, a Trie, or as another type of data structure in file store 334 or metadata store 332 and adds a reference to the data structure holding the extracted strings and associated extracted string attributes to the metadata of the media content object. According to one embodiment, CMS 330 also stores the text formatted data provided by the voice assistant tool service 310, 350 as part of the media content object (e.g., as a text format file in file store 334).

CMS 330 sends a success or failure response to ReST service 320 and ReST service 320 sends a web service success or failure response to the voice assistant tool service 310, 350 that issued the web services request. The voice assistant tool service provides that appropriate response to the voice assistant device (e.g., voice assistant tool device 302, 342), which can read the response to the user. In this example then, CMS 330 is alleviated from the burden of performing the ASR on the audio data.

In another embodiment, a skill can be implemented to "store the following to CMS [additional speech]," where the voice assistant service 310, 350 only converts the user's speech to text for purposes of invoking the skill. In such an embodiment, the voice assistant tool service 310, 350 issues a web services call to ReST service 320 to store a media file containing the [additional speech] as a media content object. ReST service 320 issues the appropriate call (e.g., RPC, gRPC or other call) to CMS 330. CMS 330 processes the media file as discussed above with respect to FIG. 1 and FIG. 2 to convert the media file to text formatted data, extract strings and extracted string attributes and store the media file with extracted strings and associated extracted string attributes as a media content object having metadata in metadata store 332 and the media file in file store 334. In some embodiments, CMS 330 also stores the text formatted data generated from the media file as part of the media content object. CMS 330 sends a success or failure response to ReST service 320 and ReST service 320 sends a web service success or failure response to the voice assistant tool service 310, 350 that issued the web services request. The voice assistant tool service provides that appropriate response to the voice assistant device (e.g., voice assistant tool device 302, 342), which can read the response to the user.

It will also be appreciated that voice assistant services may integrate with a variety of cloud storage solutions. A skill can be implemented at voice assistant tool service 310, 350 to "move [file] from [cloud storage] to CMS." In such an embodiment, the voice assistant tool service 310, 350 can be configured to process the command to issue commands to the cloud storage to retrieve the file and then issue web services requests to ReST service 320 to store the file to CMS 330. If the file is a media file, CMS 330 can process the media file to store the file as a media content object that is searchable based on extracted strings as discussed above with respect to FIGS. 1 and 2. In some embodiments, CMS 330 also stores the text formatted data generated from the media file as part of the media content object. CMS 330 sends a success or failure response to ReST service 320 and ReST service 320 sends a web service success or failure response to the voice assistant tool service 310, 350 that issued the web services request. The voice assistant tool service provides that appropriate response to the voice assistant device (e.g., voice assistant tool device 302, 342), which can read the response to the user.

As yet another example, skills can be implemented that make use of the CMS 330's search capability. For example, a skill can be implemented to "ask CMS for details about [additional speech]". In such an embodiment, the voice assistant tool service 310, 350 processes the user's speech to convert the user's speech to text and then issues a web services request to ReST service 320 to search data store 331 for search string(s) generated from the [additional speech]. ReST service 320 issues a call to CMS 330 to search data store 331 for objects including the strings. CMS can search content objects including searching media content objects based on extracted strings to identify content objects matching the search string(s). CMS 330 sends the search results to ReST service 320 and ReST service 320 sends a web service response to the voice assistant tool service 310, 350 that issued the web services request. The voice assistant tool service provides the search results to the voice assistant device (e.g., voice assistant tool device 302, 342), which can read the search results to the user.

As will be appreciated, the foregoing skills were provided simply by way of example and a large number of skills can be implemented at voice assistant services to take advantage of CMS 330's capabilities to manage and search media content.

Figure 4:
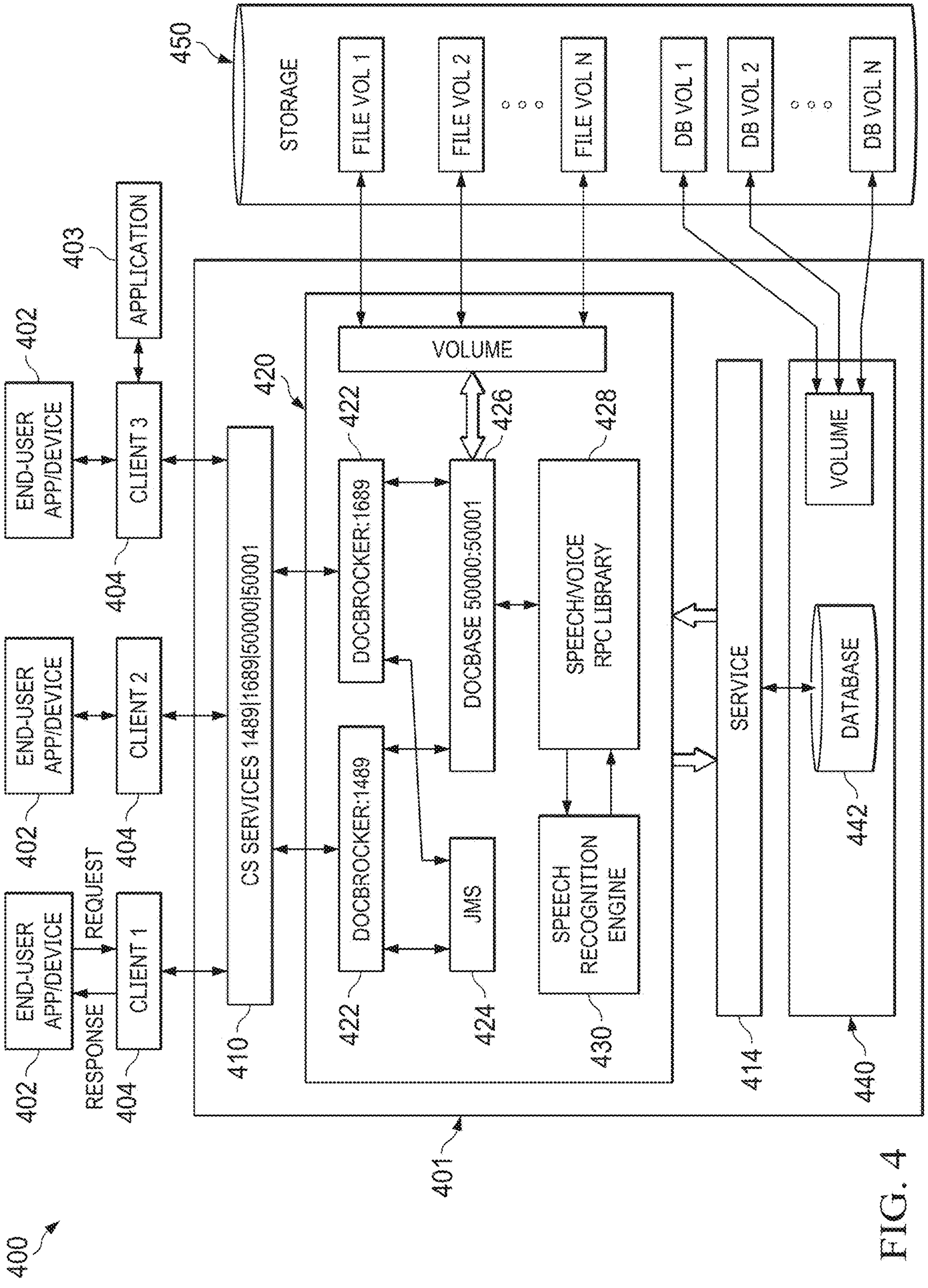
FIG. 4 is a diagrammatic representation of one embodiment of an environment that includes cloud-based management and searching content.

As will be appreciated, a CMS (e.g., CMS 110, CMS implementing content server 210, CMS 330) can be implemented according to a variety of architectures. FIG. 4 is a diagrammatic representation of one embodiment of an environment 400 that includes a cloud-based CMS 401 adapted to manage and search content, including media content. In the illustrated embodiment, CMS 401 is based on the DOCUMENTUM CMS (DOCUMENTUM is a trademark of Open Text Corporation; all trademarks cited herein are the property of their respective owners).

CMS 401 includes a content server pod (CS pod) 420, a database pod 440 and persistent store 450, which comprises a plurality of persistent volumes. A pod, in this context, represents processes running in a cluster and, more particularly, represents a unit of deployment (an instance of an application). According to one embodiment, a pod encapsulates an application's execution container(s), storage resources, network address, and options governing how the application's execution container(s) run. CS pod 420 thus represents an instance of a content server and database pod 440 represents an instance of a relational database management system (RDMS) that provides a relational database 442. In other embodiments, the database is a non-relational database. CS pod 420 is executable to provide CS services 410 through which client applications 404 can access and perform operations on content and database pod 440 is executable to provide services 414 through which components of CS pod 420 can access and perform operations on data in database 442. There may be multiple CS pods 420 and database pods 440 running in a cluster. Each persistent volume is a piece of storage in a cluster that has been provisioned.

Client applications 404 provide interfaces between various end-user applications and the content server (CS) services 410, which for the sake of example are provided on ports 1489, 1689, 50000, 50001 in the illustrated embodiment. According to one embodiment, client applications 404 run on application servers to provide interfaces for end-user applications 402, such as browser-based applications or other end-user applications. Further, a client application 404 may interface between other types of applications (e.g., application 403) and CMS 401. For example, a client application 404 interfaces between a service or application, such as a voice assistant tool service or application, and the CMS 401. According to one embodiment, interfaces to CS services 410 can be provided using a DOCUMENTUM Foundation Class (DFC).

CS pod 420 includes a plurality of docbrokers 422 (e.g., a docbroker on port 1489 and a docbroker on port 1689). In one embodiment, docbrokers 422 are services of a content server. In another embodiment, docbrokers 422 are separately running services. A docbroker 422 acts as a service registry for services of CMS 401, maintains maps of services to servers providing the services and acts as a name server for the content servers and/or other servers of CS pod 420. When a connect method is issued by a client application 404, the request goes to the docbroker 422 identified in an initialization file in the respective client device. When an application 404 wants to find an available server for a service, the docbroker 422 looks up the servers that provide the service in its server map and provides the server information to the application 404. Once the client application 404 has the details of the server, the application can connect to the server to perform other operations.

CS pod 420 further includes a Java Method Server (JMS) 424. According to one embodiment, JMS 424 is an application server for executing content server java methods. The server may itself be a Java-based web application that communicates with the content server via HTTP calls. Each time a method is invoked, the content server makes an HTTP request passing the name of the Java class which implements the method along with any specified arguments to a servlet configured to execute the specified method. JMS may be used for running Java methods that constitute lifecycle and flow management activities.

CS pod 420 further includes a docbase 426 that represents and manages an object-based repository provided by the content server (e.g., on ports 50000:50001 in the illustrated embodiment). The repository includes content storage to store content files and metadata storage to store properties of these content files. In the illustrated embodiment, for example, docbase 426 stores files to one or more persistent volumes of persistent storage 450 and stores metadata to relational database 442, which may be persisted in one or more DB volumes of persistent storage 450. Multiple docbases may be implemented through the same file storage system and RDBMS.

CS pod 420 further includes an RPC library 428 and a speech recognition engine 430. When docbase 426 receives a request to store a media file, docbase 426 issues an RPC call to speech recognition engine 430 to process the media file. Speech recognition engine 430 implements a speech-to-text/data engine to convert the media file to text formatted data, extract strings and determine associated extracted string attributes. Docbase 426 stores the media file as a media content object. More particularly, docbase 426 stores the media file in a file volume in persistent store 450 and the metadata in relational database 442. The metadata may be further written to a DB volume in persistent store 450.

Docbase 426 further configures the media content object to be searchable based on the extracted strings. According to one embodiment, docbase 426 stores the extracted strings and associated extracted string attributes in the metadata of the media content object, for example in one or more repeating properties of the media content object. In addition, or in the alternative, docbase 426 stores extracted strings and associated extracted string attributes as a file (e.g., in a csv format or other format), a Trie, a database blob or as another type of data structure in a file volume or in DB 442 and adds a reference to the data structure holding the extracted strings and associated extracted string attributes to the metadata of the media content object. The media file can thus be indexed and searched based on the extracted strings.

Figure 5:
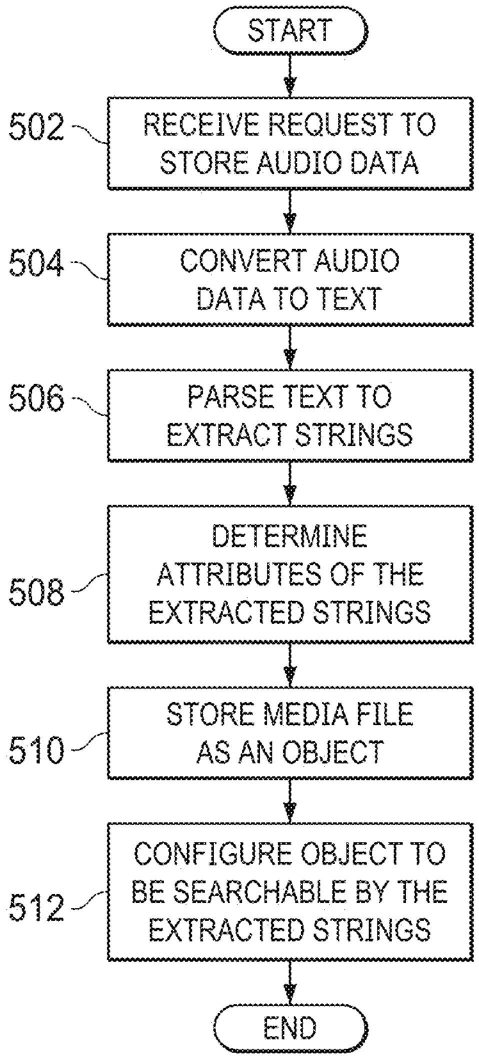
FIG. 5 is a flow chart illustrating one embodiment of a method for storing media data.

FIG. 5 is a flow chart illustrating one embodiment of a method for storing media data. The method of FIG. 5 may be implemented through execution of computer readable program code embodied on a non-transitory computer readable medium.

A CMS (such, but not limited to, CMSs discussed above in conjunction with FIGS. 1-4) receives a request to store audio data (step 502). The audio data may be received as streamed media data, as a media file (e.g., audio or video file) or according to any other media data format. The CMS converts the audio data to text formatted data (step 504). In some embodiments, this may include the CMS encoding streamed media data (e.g., streamed audio or video) as a media file and then processing the media file to convert the media file to a text formatted data version of the media file.

The CMS parses the text generated in step 504 for one or more target strings. If a string in the text matches a target string, the CMS extracts the string as an extracted string (step 506). The CMS further determines an extracted string attribute associated with the extracted string (step 508). An extracted string attribute associated with an extracted string may be, for example, a metric such as a number of times the extracted string appears in a set of text. An extracted string attribute for an extracted string may also include information about the string that can be extracted from the text. As will be appreciated, the types of information about an extracted string that can be determined from the text may depend, at least in part, on the text formatted data generated at step 504. For example, if the text formatted data includes the temporal location of each word or block of words in a media file, then the CMS can extract, as an attribute of the extracted string, the temporal location at which the extracted string occurs in the media file. As another example, if the text formatted data includes the gender of the speaker, the CMS can extract the gender of the speaker as an attribute of an extracted string.

The CMS stores the media file as a media content object (step 510). The content object includes associated content object metadata and an associated content file. In some embodiments, the CMS parses the file metadata or other metadata provided for the audio data, automatically generates other metadata as dictated by implementation, and stores such metadata as metadata of the content object. The CMS further stores the media file as the associated content file of the media content object.

The CMS configures the media content object to be searchable by the extracted strings extracted from the media file (step 512). For example, CMS adds the extracted strings and the extracted string attributes associated with those strings to the media content object in a data structure that is indexable or otherwise searchable by a search engine. In one embodiment, the CMS stores the extracted strings, along with associated attributes as properties of the media file. In an even more particular embodiment, the CMS stores the extracted strings, along with associated extracted string attributes in one or more repeating properties of the media file. In other embodiments, the CMS stores the extracted strings and associated extracted string attributes in a readable formatted file (for example, a csv file or other formatted file), a text file, a database blob object, a Trie or as another type of data structure in a file system or database (e.g., relational database or non-relational database) and adds a reference to the data structure holding the extracted strings to the media content object so that a search engine can index or search the data structure as part of indexing or searching the media content object.

FIG. 5 is provided by way of example and not limitation. Various steps may be repeated, steps may be performed in different orders, steps omitted, and additional or alternative steps performed.

Figure 6:
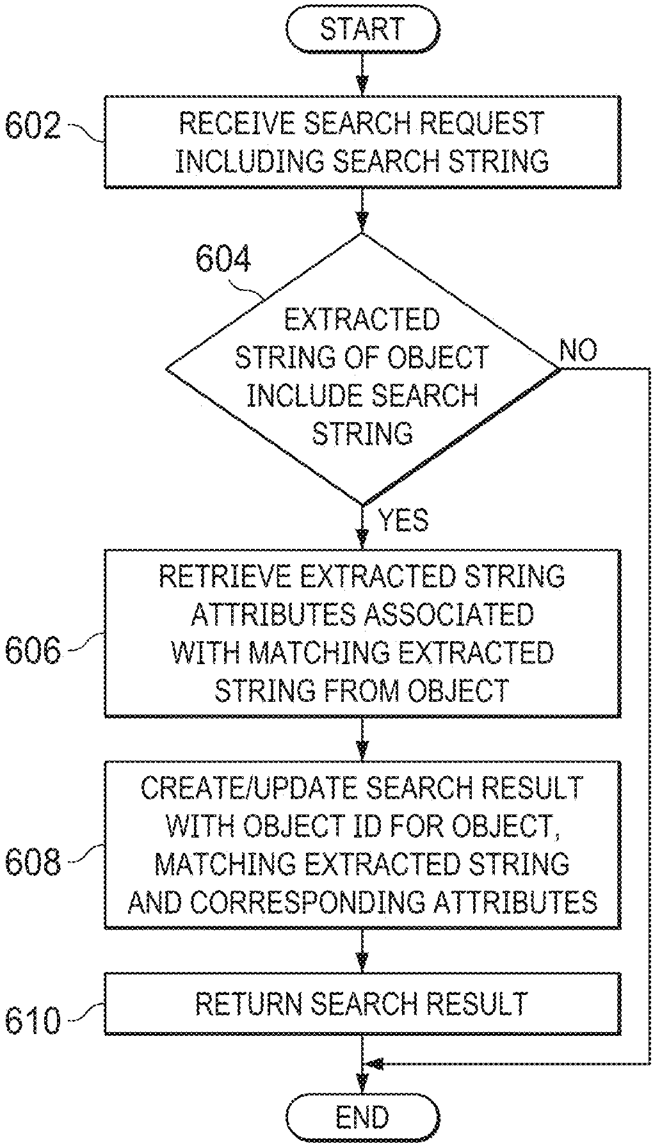
FIG. 6 is a flow chart illustrating one embodiment of a method for searching media data.

FIG. 6 is a flow chart illustrating one embodiment of a method for searching media data. The method of FIG. 6 may be implemented through execution of computer readable program code embodied on a non-transitory computer readable medium.

A CMS storing content objects, including media content objects configured to be searchable based on extracted strings, (such, but not limited to, CMSs discussed above in conjunction with FIGS. 1-4) receives a search request that includes a search string (step 602). The CMS can search the content objects to locate content objects that include the search string. This can include, for example, searching the extracted strings associated with media content objects.

Thus, for example, the CMS can determine if any extracted strings of a media content object match the search string (step 604). If an extracted string of a media content object matches the search string, the CMS retrieves the associated extracted string attributes, if any, for the extracted string (step 606) and creates or updates a search result to include the object id of the object that matched the search string, the matching extracted string and the corresponding extracted string attributes for the matching extracted string (step 608). The CMS returns the search result to the requestor (step 610).

FIG. 6 is provided by way of example and not limitation. Various steps may be repeated, steps performed in different orders, steps omitted, and additional or alternative steps performed.

Figure 7:
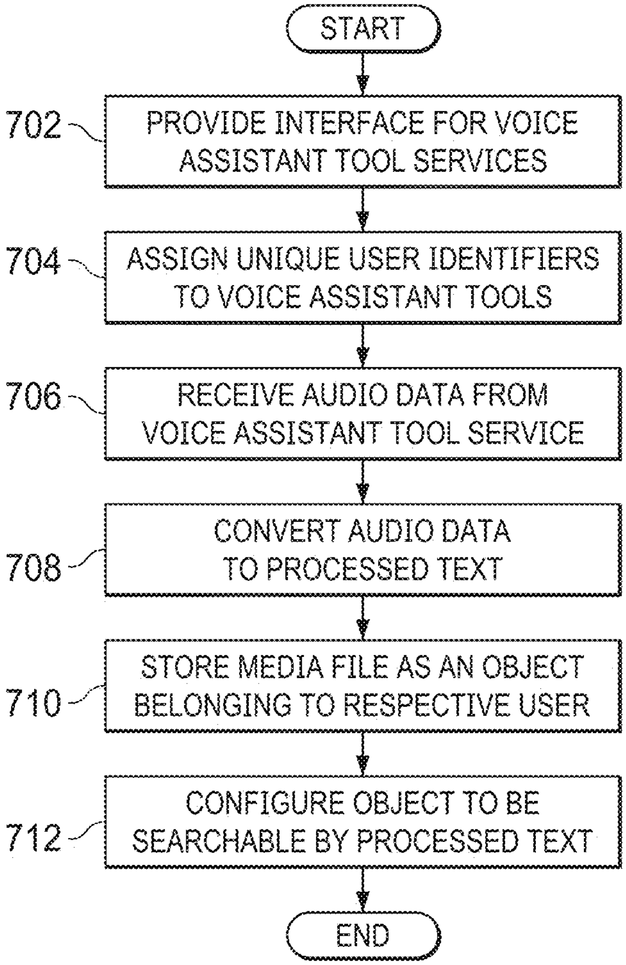
FIG. 7 is a flow chart illustrating another embodiment of a method for storing media data.

FIG. 7 illustrates one embodiment of a method for storing media data. The method of FIG. 7 may be implemented through execution of computer readable program code embodied on a non-transitory computer readable medium.

A CMS (such, but not limited to, CMSs discussed above in conjunction with FIGS. 1-4) provides an interface for voice assistant tool services (step 702). Each voice assistant tool device is assigned a unique identifier at the CMS (step 704) (e.g., unique user identifier). The CMS receives a request to store audio data associated with a voice assistant tool device from the voice assistant tool service (step 706). The audio data may be received as streamed media data, as a media file (e.g., audio or video file) or according to any other media data format. In some embodiments, the voice assistant tool service provides a text formatted data version of the media file.

The CMS converts the audio data to processed text (step 708). In some embodiments, this may include the CMS encoding streamed media data (e.g., streamed audio or video) as a media file and then processing the media file to convert the media file to a text formatted data version of the media file. The CMS parses the text formatted data version of the media file provided by the voice assistant tool service or generated by the CMS for one or more target strings. If a string in the text matches a target string, the CMS extracts the string as an extracted string. The CMS further determines an extracted string attribute associated with the extracted string.

The CMS stores the media file as a media content object (step 710). The content object includes associated content object metadata and an associated content file. In some embodiments, the CMS parses the file metadata or other metadata provided for the audio data, automatically generates other metadata as dictated by implementation, and stores such metadata as metadata of the content object. The metadata can include, for example, the identifier for a voice assistant tool device that requested to store the audio data. The CMS further stores the media file as the associated content file of the media content object.

The CMS configures the media content object to be searchable by the extracted strings extracted from the media file (step 712). For example, the CMS adds the extracted strings and the extracted string attributes associated with those strings to the media content object in a data structure that is indexable or otherwise searchable by a search engine. In one embodiment, the CMS stores the extracted strings, along with associated attributes as properties of the media file. In an even more particular embodiment, the CMS stores the extracted strings, along with associated extracted string attributes in one or more repeating properties of the media file. In other embodiments, the CMS stores the extracted strings and associated extracted string attributes in a readable formatted file (for example, a csv file or other formatted file), a text file, a database blob object, a Trie or as another type of data structure in a file system or database (e.g., relational database or non-relational database) and adds a reference to the data structure holding the extracted strings to the media content object so that a search engine can index or search the data structure as part of indexing or searching the media content object.

FIG. 7 is provided by way of example and not limitation. Various steps may be repeated, steps performed in different orders, steps omitted, and additional or alternative steps performed.

Figure 8:
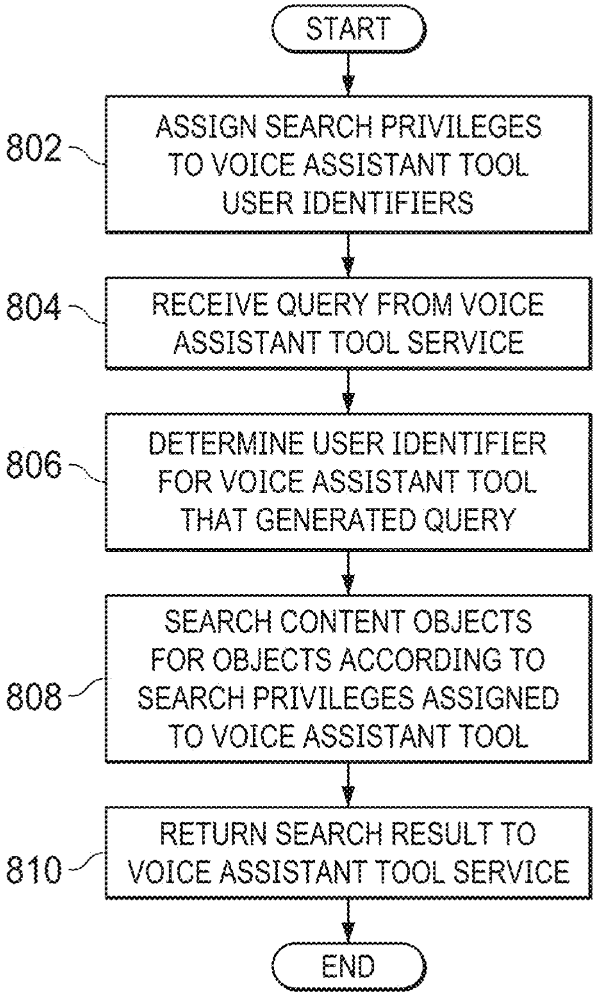
FIG. 8 is a flow chart illustrating another embodiment of a method for searching media data.

FIG. 8 is a flow chart illustrating one embodiment of a method for searching media data. The method of FIG. 8 may be implemented through execution of computer readable program code embodied on a non-transitory computer readable medium.

According to the method of FIG. 8, search privileges are assigned to voice assistant tool user identifiers (step 802). A CMS storing content objects, including media content objects configured to be searchable based on extracted strings, (such, but not limited to, CMSs discussed above in conjunction with FIGS. 1-4) receives a search query from a voice assistant tool service, the search query containing search criteria and associated with a voice assistant tool device user identifier (step 804).

The CMS determines the user identifier for the voice assistant tool device that generated the query (step 806). The CMS searches the repository for content objects that match the search criteria according to the search privileges assigned to the voice assistant tool device user identifier (step 808). Searching content objects can include searching the extracted strings associated with media content objects as discussed, for example, in FIG. 6. The CMS returns the search result to the voice assistant tool service (step 810).

FIG. 8 is provided by way of example and not limitation. Various steps may be repeated, steps performed in different orders, steps omitted, and additional or alternative steps performed.

Figure 9:
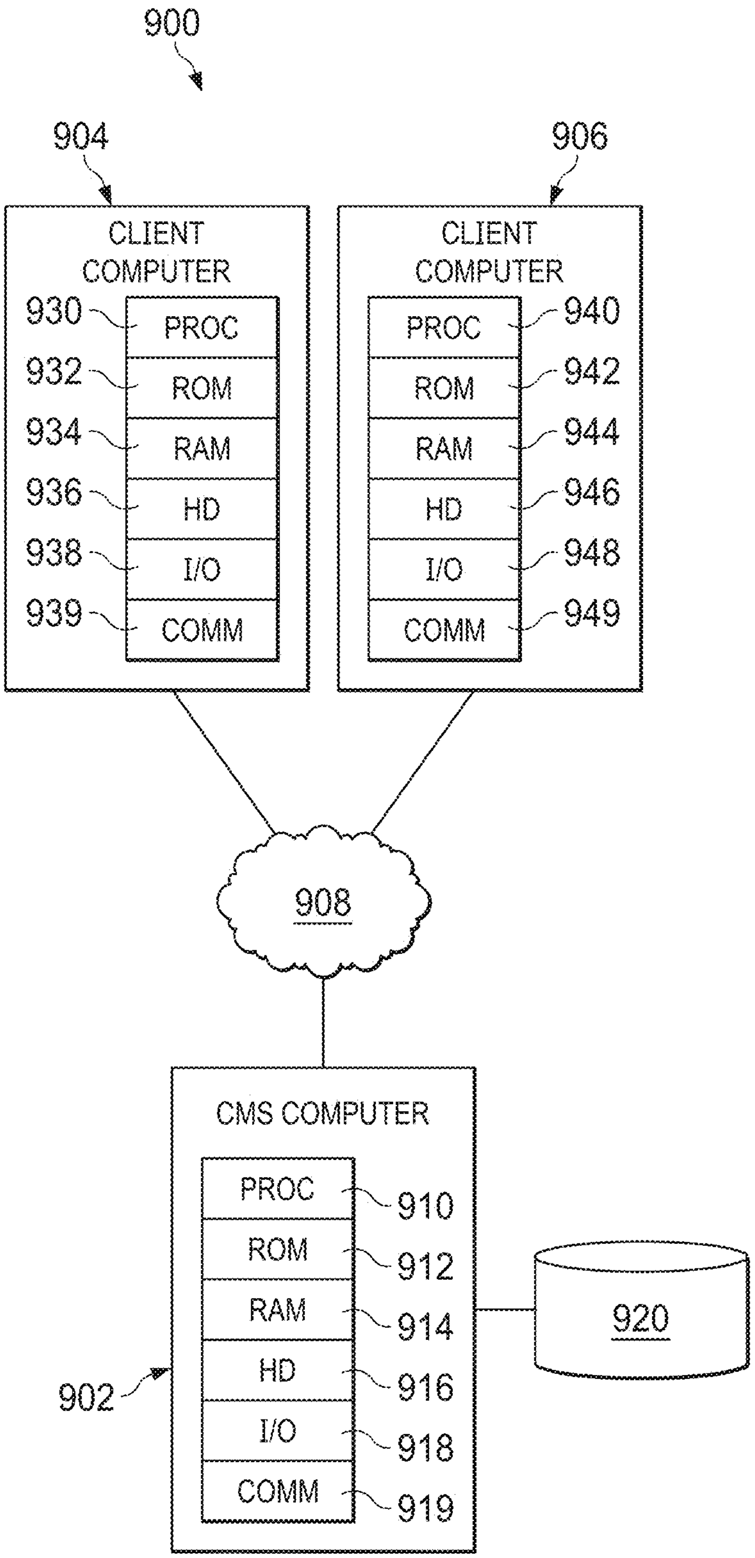
FIG. 9 illustrates one embodiment of a distributed network environment.

FIG. 9 is a diagrammatic representation of one embodiment of a distributed network computing environment 900. In the example illustrated, network computing environment 900 includes network 908 that can be bi-directionally coupled to a CMS server computer 902 and client computers 904, 906. Network 908 may represent a combination of wired and wireless networks that network computing environment 900 may utilize for various types of network communications known to those skilled in the art. For the purpose of illustration, a single system is shown for each of computers 902, 904, and 906. However, each of computers 902, 904 and 906 may comprise a plurality of computers (not shown) interconnected to each other over network 908. For example, a plurality of computers 902, a plurality of computers 904 and a plurality of computers 906 may be coupled to network 908. Computers 904, 906 may include data processing systems for communicating with computer 902.

CMS server computer 902 includes central processing unit ("CPU") 910, read-only memory ("ROM") 912, random access memory ("RAM") 914, hard drive ("HD") or storage memory 916, input/output device(s) ("I/O") 918 and communication interface 919. I/O 918 can include a keyboard, monitor, printer, electronic pointing device (e.g., mouse, trackball, stylus, etc.), or the like. Communications interface may include a communications interface, such as a network interface card, to interface with network 908. Computer 902 may provide a variety of services to computers 904, 906 over network 908. These services may utilize data stored in data store 920. According to one embodiment, server computer 902 may include computer executable instructions stored on a non-transitory computer readable medium coupled to a processor. The computer executable instructions of server computer 902 may be executable to provide a CMS or content server (e.g., CMS 110, one or more components of FIG. 2, CMS 330, CMS 401 or other content management system) to store and/or search media content and other content in a data store 920, which may comprise file storage and metadata store.

Computer 904 comprises CPU 930, ROM 932, RAM 934, HD 936, I/O 938 and communications interface 939. I/O 938 can include a keyboard, monitor, printer, electronic pointing device (e.g., mouse, trackball, stylus, etc.), or the like. Communications interface 939 may include a communications interface, such as a network interface card, to interface with network 908. Computer 906 may similarly include CPU 940, ROM 942, RAM 944, HD 946, I/O 948 and communications interface 949. According to one embodiment, client computers 904, 906 can comprise client applications (e.g., client applications 103, 107, 206, 404) or other application to interact with the CMS.

In one embodiment, client computers 904, 906 implement application servers. Distributed network computing environment 900 may thus further include end-user terminals (not illustrated) running end-user applications that connect via network 908 to the client applications of client computers 904, 906. In other embodiments, client computers 904, 906 may be end-user terminals.

Each of the computers in FIG. 9 may have more than one CPU, ROM, RAM, HD, I/O, or other hardware components. For the sake of brevity, each computer is illustrated as having one of each of the hardware components, even if more than one is used. Each of computers 902, 904 and 906 is an example of a data processing system. ROM 912, 932, and 942; RAM 914, 934, and 944; HD 916, 936, and 946; and data store 920 can include media that can be read by CPU 910, 930, or 940. These memories may be internal or external to computers 902, 904, or 906.

Portions of the methods described herein may be implemented in suitable software code that may reside within ROM 912, 932, and 942; RAM 914, 934, and 944; HD 916, 936, and 946. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer-readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums. In some embodiments, data may be stored in multiple databases, multiple filesystems or a combination thereof.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description (including the Abstract and Summary) is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A computer program product comprising a non-transitory computer-readable medium storing computer-readable instructions for:

- establishing communication between a voice assistant tool device and a content management repository;
- assigning, by the content management repository, a unique user identifier to the voice assistant tool device;
- receiving, by the content management repository, a request to store a content object associated with a voice assistant tool device, wherein the request comprises:
  - a media file; and
  - the unique user identifier of the voice assistant tool device;
- converting, by the content management repository, the media file to a set of text;
- accessing a configuration defining:
  - one or more target strings;
  - one or more target attributes associated with at least some of the one or more target strings; and
  - one or more target object properties defined in a schema of the content management repository;
- extracting a plurality of strings from the set of text by matching text from the set of text to the one or more target strings defined in the configuration;
- determining, for each respective extracted string for which one or more target attributes are defined in the configuration, one or more corresponding attributes based on the one or more target attributes defined in the configuration, wherein the one or more corresponding attributes is a temporal location in the media file at which the corresponding extracted string appears in the content object;
- storing the content object in the content management repository as a managed object, the managed object comprising a set of object properties, wherein the set of object properties comprises:
  - the extracted strings stored in the one or more target object properties;
  - the one or more corresponding attributes determined for the respective extracted strings; and
  - the unique user identifier stored as an owner property of the managed object;
- configuring the managed object to be searchable based on the set of object properties;
- receiving a search query from a requestor, the search query containing a search string and a unique user identifier;
- determining a search privilege for the search query by verifying the unique user identifier from the search query against the owner property stored within the set of object properties of the managed object;
- searching a plurality of managed objects in the content management repository according to the determined search privilege and the search string, the searching comprising:
  - determining that the search string matches an extracted string stored as an object property of the content object; and
- when the search string matches the extracted string, returning a search result, the matching extracted string, and the one or more corresponding attributes for the matching extracted string to the voice assistant tool device.

2. The computer program product of claim 1, wherein the establishing communication comprises connecting the voice assistant tool device with the content management repository through a Representational State Transfer (ReST) application programming interface.

3. The computer program product of claim 1, wherein the computer-readable instructions further comprise instructions for:

- presenting, by the content management repository, a user interface for a voice assistant tool service;
- determining that the request comprises audio data; and
- storing the content object in the content management repository as belonging to the voice assistant device.

4. The computer program product of claim 1, wherein the computer-readable instructions further comprise instructions for:

- presenting a graphical user interface displaying the search result, wherein the search result comprises the content object; and
- presenting an audio user interface that audibly communicates the search result.

5. The computer program product of claim 1, wherein the voice assistant tool device is at least one of a smart speaker, a smartphone, and a wearable device.

6. A method for managing content, the method comprising:

- establishing communication between a voice assistant tool device and a content management repository;
- assigning, by the content management repository, a unique user identifier to the voice assistant tool device;

receiving, by the content management repository, a request to store a content object associated with a voice assistant tool device, wherein the request comprises:

a media file; and the unique user identifier of the voice assistant tool device;

converting, by the content management repository, the media file to a set of text;

accessing a configuration defining:

one or more target strings;

one or more target attributes associated with the one or more target strings; and one or more target object properties defined in a schema of the content management repository;

extracting a plurality of strings from the set of text by matching text from the set of text to the one or more target strings defined in the configuration;

determining, for each respective extracted string for which one or more target attributes are defined in the configuration, one or more corresponding attributes based on the one or more target attributes defined in the configuration, wherein the one or more corresponding attributes is a temporal location in the media file at which the corresponding extracted string appears in the content object;

storing the content object in the content management repository as a managed object, the managed object comprising a set of object properties, wherein the set of object properties comprises:

the extracted strings stored in the one or more target object properties;

the one or more corresponding attributes determined for the respective extracted strings; and the unique user identifier stored as an owner property of the managed object;

configuring the managed object to be searchable based on the set of object properties;

receiving a search query from a requestor, the search query containing a search string and a unique user identifier;

determining a search privilege for the search query by verifying the unique user identifier from the search query against the owner property stored within the set of object properties of the managed object;

searching a plurality of managed objects in the content management repository according to the determined search privilege and the search string, the searching comprising:

determining that the search string matches an extracted string stored as an object property of the content object; and when the search string matches the extracted string, returning a search result, the matching extracted string, and the one or more corresponding attributes for the matching extracted string to the voice assistant tool device.

7. The method of claim 6, wherein the establishing communication comprises connecting the voice assistant tool device with the content management repository through a Representational State Transfer (ReST) application programming interface.

8. The method of claim 6, further comprising:

presenting, by the content management repository, a user interface for a voice assistant tool service;

determining that the request comprises audio data; and storing the content object in the content management repository as belonging to the voice assistant device.

9. The method of claim 6, further comprising:

presenting a graphical user interface displaying the search result, wherein the search result comprises the content object; and presenting an audio user interface that audibly communicates the search result.

10. The method of claim 6, wherein the voice assistant tool device is at least one of a smart speaker, a smartphone, and a wearable device.

11. A system for managing content, the system comprising:

a client computer comprising a client application executable to provide a communication interface between an end-user and a content management system;

a data store comprising a content management repository storing a plurality of managed objects;

a server computer coupled to the client computer by a network, the server computer comprising code for:

establishing, through the communication interface of the content management system, communication between a voice assistant tool device of the end-user and the content management system;

assigning, by the content management system, a unique user identifier to the voice assistant tool device;

receiving, by a search engine of the content management system, a request to store a content object associated with a voice assistant tool device, wherein the request comprises:

a media file; and the unique user identifier of the voice assistant tool device;

converting, by the content management repository;

converting, by a data engine of the content management system, the media file to a set of text;

accessing a configuration defining:

one or more target strings;

one or more target attributes associated with the one or more target strings; and one or more target object properties defined in a schema of the content management repository;

extracting a plurality of strings from the set of text by matching text from the set of text to the one or more target strings defined in the configuration;

determining, for each respective extracted string for which one or more target attributes are defined in the configuration, one or more corresponding attributes based on the one or more target attributes defined in the configuration, wherein the one or more corresponding attributes is a temporal location in the media file at which the corresponding extracted string appears in the content object;

storing, by the data engine, the content object in a data store of a content management repository as a managed object, the managed object comprising a set of object properties, wherein the set of object properties comprises:

the extracted strings stored in the one or more target object properties;

the one or more corresponding attributes determined for the respective extracted strings; and the unique user identifier stored as an owner property of the managed object;

configuring the managed object to be searchable based on the set of object properties;

receiving a search query from a requestor, the search query containing a search string and a unique user identifier;

determining, by the server of the content management system, a search privilege for the search query by verifying the unique user identifier from the search query against the owner property stored within the set of object properties of the managed object;

searching, by a search engine, a plurality of managed objects in the data store of the content management repository according to the determined search privilege and the search string, the searching comprising:

determining that the search string matches an extracted string stored as an object property of the content object; and when the search string matches the extracted string, returning a search result, the matching extracted string, and the one or more corresponding attributes for the matching extracted string to the voice assistant tool device.

12. The system of claim 11, wherein the establishing communication comprises connecting the voice assistant tool device with the content management repository through a Representational State Transfer (ReST) application programming interface.

13. The system of claim 11, wherein the server computer further comprises code for:

presenting, by the content management system, a user interface for a voice assistant tool service;

determining that the request comprises audio data; and storing the content object in the content management repository as belonging to the voice assistant device.

14. The system of claim 11, wherein the server computer further comprises code for:

presenting a graphical user interface displaying the search result, wherein the search result comprises the content object, and presenting an audio user interface that audibly communicates the search result.

* * * * *